United States Patent
Murasawa et al.

(10) Patent No.: US 10,434,845 B2
(45) Date of Patent: Oct. 8, 2019

(54) POWER SLIDE WINDOW

(71) Applicant: Yachiyo Industry Co., Ltd., Saitama (JP)

(72) Inventors: Akira Murasawa, Utsunomiya (JP); Tatsuaki Uehara, Tokyo (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 16/327,439

(22) PCT Filed: Aug. 22, 2017

(86) PCT No.: PCT/JP2017/029946
§ 371 (c)(1),
(2) Date: Feb. 22, 2019

(87) PCT Pub. No.: WO2018/047614
PCT Pub. Date: Mar. 15, 2018

(65) Prior Publication Data
US 2019/0194992 A1 Jun. 27, 2019

(30) Foreign Application Priority Data

Sep. 9, 2016 (JP) .................................. 2016-176716
Nov. 16, 2016 (JP) .................................. 2016-222967

(51) Int. Cl.
*B60J 1/18* (2006.01)
*E05F 15/638* (2015.01)
*E05D 15/10* (2006.01)

(52) U.S. Cl.
CPC .............. *B60J 1/1853* (2013.01); *B60J 1/18* (2013.01); *E05F 15/638* (2015.01);
(Continued)

(58) Field of Classification Search
CPC .............................. B60J 1/1853; E05F 15/638
See application file for complete search history.

(56) References Cited

U.S. PATENT DOCUMENTS 5,542,214 A * 8/1996 Buening .................... B60J 1/16
49/127
5,613,323 A * 3/1997 Buening .................... B60J 1/16
49/130
(Continued)

FOREIGN PATENT DOCUMENTS

EP 2228245 A1 * 9/2010 ................ B60J 1/16
FR 2833209 A1 * 6/2003 ................ B60J 1/16
(Continued)

OTHER PUBLICATIONS

International Search Report for PCT/JP2017/029946 dated Oct. 12, 2017, 2 pages.

*Primary Examiner* — Catherine A Kelly
(74) *Attorney, Agent, or Firm* — Dority & Manning, P.A.

(57) ABSTRACT

An opening formed in a window glass pane is smoothly opened and closed by a slide panel slidingly driven along a panel surface of the window glass pane and along a direction orthogonal to the panel surface. The guide rail (4) is provided with a pin guide groove (27) including a groove main portion (27a) and a groove extension portion (27b). A slider (20) is provided with a pin drive groove (30) extending in a direction crossing the panel surface. The slide panel is provided with at least one pin (16) projecting into the pin drive groove and the pin guide groove so that the slide panel is positioned in a closed position when the pin is positioned in the groove extension portion, and in an open position when the pin is positioned in the groove main portion.

4 Claims, 7 Drawing Sheets

(52) U.S. Cl.
CPC ... *B60Y 2200/14* (2013.01); *E05D 2015/1028* (2013.01); *E05Y 2900/55* (2013.01)

(56) References Cited

U.S. PATENT DOCUMENTS

| | | | | |
|---|---|---|---|---|
| 5,799,444 | A * | 9/1998 | Freimark | B60J 1/1853 |
| | | | | 49/209 |
| 5,836,110 | A * | 11/1998 | Buening | B60J 1/16 |
| | | | | 49/360 |
| 7,219,470 | B2 * | 5/2007 | Lahnala | B60J 1/1853 |
| | | | | 16/95 R |
| 7,437,852 | B2 * | 10/2008 | Dufour | E05F 11/535 |
| | | | | 49/213 |
| 7,464,501 | B2 * | 12/2008 | Arimoto | E05F 15/646 |
| | | | | 49/209 |
| 7,509,773 | B2 * | 3/2009 | Vornbaumen | E05F 11/423 |
| | | | | 49/209 |
| 7,568,312 | B2 * | 8/2009 | Dufour | B60J 1/1853 |
| | | | | 49/216 |
| 7,584,574 | B2 * | 9/2009 | Kinross | B60J 1/1853 |
| | | | | 49/209 |
| 7,641,265 | B2 * | 1/2010 | Seiple | B60J 1/1853 |
| | | | | 296/190.1 |
| 8,469,437 | B2 * | 6/2013 | Zanetti | E05D 15/1047 |
| | | | | 296/146.16 |
| 8,474,186 | B2 * | 7/2013 | Dufour | B60J 1/1853 |
| | | | | 49/380 |
| 8,562,063 | B2 * | 10/2013 | Giret | B60J 1/16 |
| | | | | 296/146.15 |
| 8,578,654 | B2 * | 11/2013 | Rao | E05F 11/535 |
| | | | | 49/209 |
| 8,769,872 | B2 * | 7/2014 | Maltaverne | B60J 1/16 |
| | | | | 49/209 |
| 8,813,425 | B2 * | 8/2014 | Ash, Jr. | E05F 15/00 |
| | | | | 49/380 |
| 9,027,282 | B2 * | 5/2015 | Schreiner | E05D 15/0608 |
| | | | | 49/210 |
| 9,487,065 | B2 * | 11/2016 | Bender | E05F 11/525 |
| 2002/0148163 | A1 * | 10/2002 | Warner | E05D 15/0652 |
| | | | | 49/209 |
| 2007/0277442 | A1 * | 12/2007 | Dery | B60J 1/16 |
| | | | | 49/362 |
| 2011/0006558 | A1 | 1/2011 | Giret et al. | |
| 2017/0254131 | A1 * | 9/2017 | Otsubo | E05D 15/10 |
| 2019/0184793 | A1 * | 6/2019 | Murasawa | B60J 1/18 |
| 2019/0194992 | A1 * | 6/2019 | Murasawa | B60J 1/18 |

FOREIGN PATENT DOCUMENTS

| | | | | |
|---|---|---|---|---|
| JP | H10100668 | | 4/1998 | |
| JP | 2015105087 | | 6/2015 | |
| WO | WO-2014082312 | A1 * | 6/2014 | ............ E05D 15/10 |

* cited by examiner

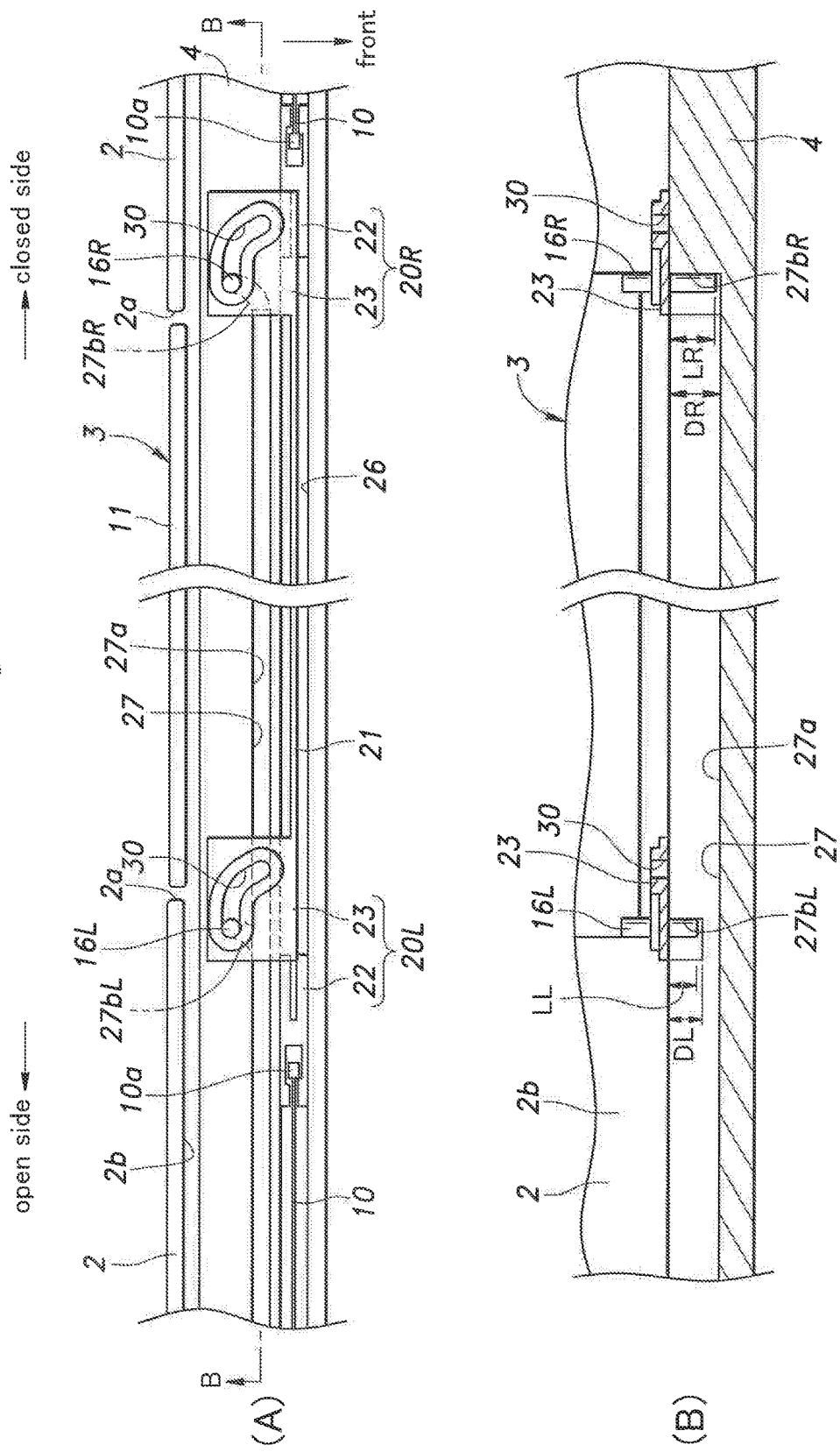

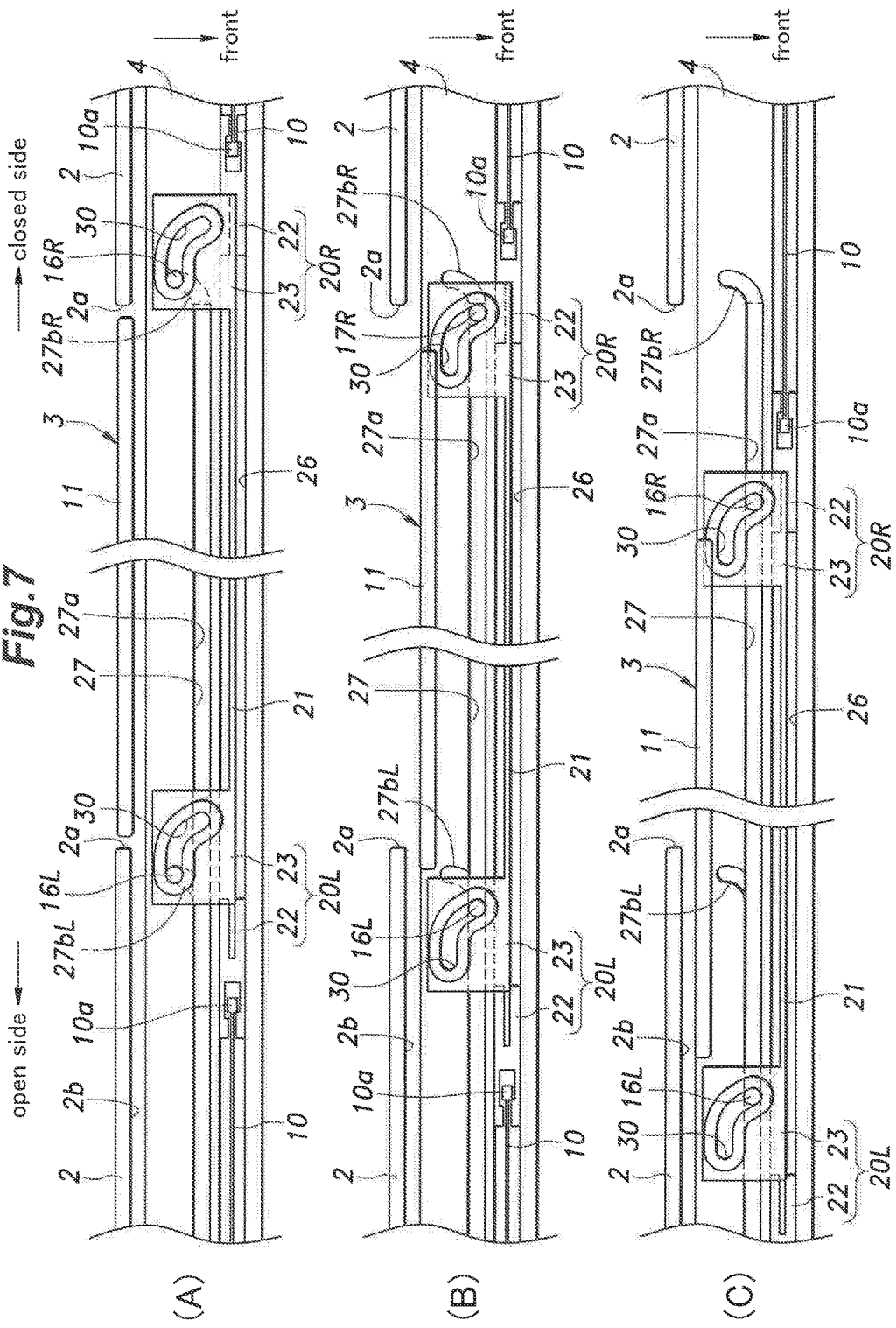

POWER SLIDE WINDOW

CROSS REFERENCE TO RELATED APPLICATIONS

This application is the U.S. National Stage entry of International Application Number PCT/JP2017/029946 filed under the Patent Cooperation Treaty having a filing date Aug. 22, 2017, which claims under to Japanese Patent Application No. 2016-176716 having a filing date of Sep. 9, 2016, and Japanese Patent Application No. 2016-222967 having a filing date Nov. 16, 2016, which are incorporated herein by reference.

TECHNICAL FIELD

The present invention relates to a power slide window for selectively closing an opening formed in a window glass pane with a slide panel that can be slidably driven by a drive source.

BACKGROUND ART

A known device for selectively closing an opening formed in a vehicle body of an automobile includes a fixed structure (window glass pane) and a slide panel provided with a peripheral frame fitted with two guide pegs (Patent Document 1). In this device, the fixed structure is provided with a guide rail on the side of the vehicle body facing the interior of the vehicle. The guide rail is internally provided with a slider forming a shuttle therein. The slider is provided with a groove including an inclined portion forming an angle of 1 to 89 degrees relative to the axial line of the sliding movement along the guide rail, and configured to receive the guide pegs so that the slide panel is enabled to move in a direction orthogonal to a major plane of the fixed structure.

The device disclosed in. Patent Document 1 includes a cable fixedly attached to an edge of the frame to be actuated by a geared motor and having a part extending substantially in parallel with the axial line of the sliding movement on the guide rail, and an automatic winding unit that can control the changes in the length of the part of the cable that is not wound around a pulley so that the operation of the device may be automated. More specifically, a drive unit is fixedly secured to a lower part of the frame and the operation of the drive unit is controlled by the geared motor via the drive cable so that the slide panel may undergo a sliding movement. The lateral movement of the drive cable is simply transmitted to the drive unit so that the slide panel slides in response to the sliding movement of the drive unit. The movement of the slide panel in a direction orthogonal to the major plane of the fixed structure is effected by the action of the automatic winding unit that releases an extra length of the cable for the purpose of controlling the changes in the length of the part of the cable not wound around the pulley.

PRIOR ART DOCUMENT(S)

Patent Document(s)

Patent Document 1: JP53008621B2

SUMMARY OF THE INVENTION

Task to be Accomplished by the Invention

However, the invention disclosed in Patent Document 1 can only slidingly drive the slide panel in the lateral direction by using the electric motor, and cannot drive the slide panel in a direction orthogonal to the surface of the window glass pane constituting the fixed structure.

In view of such a problem of the prior art, a primary object of the present invention is to provide a power slide window which can smoothly open and close an opening formed in a window glass pane with a slide panel which can be slidingly driven not only in a direction parallel with the panel surface of the window glass pane but also in a direction crossing the panel surface.

Means for Accomplishing the Task

To achieve such an object, the present invention provides a power slide window (1), comprising: a window glass pane (2) having an opening (2a) formed therein; a guide rail (4) provided on the window glass pane along a panel surface (2b) thereof; a slider (20) provided on the guide rail so as to be slidable along a lengthwise direction of the guide rail; a drive source (5) for slidingly driving the slider; a pin guide groove (27) formed in the guide rail and including a groove main portion (27a) extending along the lengthwise direction of the guide rail and at least one groove extension portion (27b) extending from the groove main portion in a direction to approach the window glass pane; at least one pin drive groove (30) formed in the slider so as to extend in a direction crossing the panel surface; and a slide panel (3) provided with at least one pin (16) projecting into the at least one pin drive groove and the pin guide groove so that the slide panel is positioned in a closed position closing the opening when the at least one pin is positioned in the at least one groove extension portion, and in an open position opening the opening when the at least one pin is positioned in the groove main portion.

Owing to this structure, when the drive source slidingly drives the slider in the lengthwise direction of the guide rail, the drive force is transmitted to the pin projecting into the pin drive groove so that the pin moves along the pin guide groove. Since the pin drive groove extends in a direction crossing the panel surface, the pin is permitted to move toward and away from the window glass pane so that the slide panel is caused to move toward and away from the window glass pane or, in other words, the slide panel is slidingly driven in a direction crossing the panel surface as the pin moves along the groove extension portion. As the pin moves along the groove main portion, the slide panel is slidingly driven in the direction along the longitudinal direction of the guide rail or along the panel surface. Thereby, the slide panel can smoothly slide between the closed position and the open position to open and close the opening, respectively.

Preferably, in this structure, the at least one pin (16) includes a first pin (16R) provided in a part of the slide panel on a side of the closed position, and a second pin (16R) provided in a part of the slide panel on a side of the open position, wherein the at least one groove extension portion (27b) includes a first groove extension portion (27bR) continuing from an end of the groove main portion. (27a) on a side of the closed position to have the first pin positioned therein when the slide panel is in the closed position, and a second groove extension portion (27bL) continuing from an intermediate part of the groove main portion (27a) with respect to the lengthwise direction to have the second pin positioned therein When the slide panel is in the closed position, and wherein the second groove extension portion is shallower than the first groove extension portion, the second pin having a smaller projecting length (LL) than a depth (DL) of the second groove extension portion, the first pin having a projecting length (LR) smaller than a depth (DR) of the first groove extension portion and greater than the depth (DL) of the second groove extension portion (LL<DL<LR<DR).

Owing to this arrangement, as the first pin and the second pin move through the first groove extension portion and the second groove extension portion, respectively, the drive force which is directed so as to cause the slide panel to move toward and away from the window glass pane is applied to both the open position side and the closed position side of the slide panel. As a result, the sliding operation of the slide panel between the closed position and the open position can be made all the more smoother. Since the second groove extension portion is shallower than the first groove extension portion, and the first pin has a projecting length which is smaller than the depth of the first groove extension portion, and greater than the depth of the second groove extension portion, even when the first pin moves in the pin guide groove beyond the second groove extension portion toward the open position side, the first pin is prevented from entering the second groove extension portion when returning to the closed position side. Also, there is no rattling when the first pin passes by the side of the second groove extension.

Preferably, in this structure, the at least one pin drive groove (30) is slanted with respect to the panel surface in a direction to move away from the window glass pane as the at least one pin drive groove extends from a side of the open position to a side of the closed position Owing to this arrangement, when the slider slides from the open position side to the closed position side, the component of the drive force in the direction to cause the pin to approach the window glass pane acts on the pin. Conversely when the slider slides from the closed position side to the open position side, the component of the drive force in the direction to move the pin away from the window glass acts on the pin. As a result, when the pin moves into and out of the groove extension portion, the slider which moves in the same direction as the movement direction moves the slide panel reliably and smoothly in the direction to move toward and away from the window glass pane.

Preferably, in this structure, the at least one pin drive groove (30) is curved so as to increase a slanting angle thereof relative to a direction orthogonal to the panel surface (2b) as the at least one pin drive groove extends toward the window glass pane (2).

Owing to this arrangement, the component of the drive force acting on the pin to move toward and away from the window glass pant becomes greater as the pin. moving along the groove extension portion approaches the window glass pane. Therefore, even when the sliding drive force acting on the slider is relatively small, the slide panel can be slid to or from the closed position in a reliable and smooth manner.

Preferably, in this structure, the at least one groove extension portion (27b) is curved toward the window glass pane (2) as the at least one groove extension portion extends from the groove main portion.

Thereby, the transition of the sliding movement of the slide panel. between the movement in the direction along the panel surface of the window glass pane and the movement in the direction crossing the panel surface can be effected in a smooth manner, whereby the sliding movement of the slide panel can be made in a smooth manner.

Effect of the Invention

Thus, the present invention provides a power slide window which can smoothly open and close an opening formed in a window glass pane with a slide panel which can be slidingly driven not only in a direction parallel with the panel surface of the window glass pane but also in a direction crossing the panel surface.

BRIEF DESCRIPTION OF THE DRAWING(S)

FIG. 6 shows (A) a sectional plan view and (B) a sectional vertical view of the power slide window in the closed state; and FIG. 7 is a diagram illustrating the mode of an opening and closing movement of the power slide window.

DESCRIPTION OF THE PREFERRED EMBODIMENT(S)

A preferred embodiment of the present invention is described in the following with reference to the appended drawings. The fore and aft, and up and down directions mentioned in the following description are based on the state where the power slide window 1 is mounted on a vehicle, and the right and left directions are based on the view point of a vehicle occupant viewing the power slide window 1 rearward from a front part of the cabin of the vehicle. The front and rear sides may be referred to as inboard side and outboard side with respect to the cabin. The similar components which are arranged in laterally opposing pairs are denoted with numerals with a different suffix R or L appended thereto depending on if the particular component is located in a right part or in a left part. When such components are collectively referred to or when no distinction is required if the particular component is located in an upper part or a lower part, or on a left hand side or a right hand side, the suffix is omitted from the numeral indicating each particular component.

Figure 1:
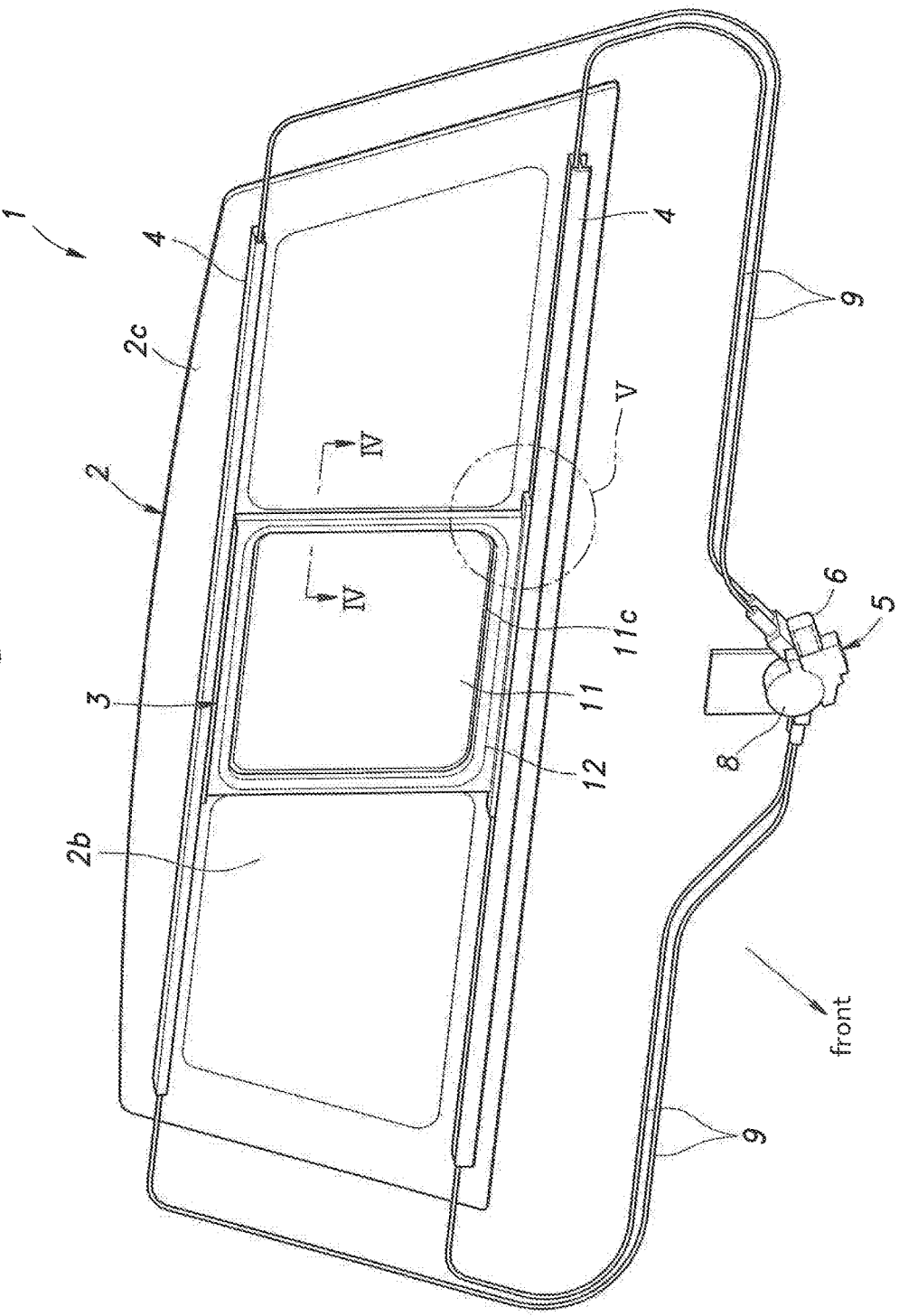
FIG. 1 is a perspective view of an overall structure of a power slide window according to an embodiment of the present invention in a closed state.

FIG. 1 is a perspective view of an overall structure of a power slide window 1 for a vehicle according to an embodiment of the present invention in a closed state as viewed from an upper front part of a passenger compartment of the vehicle. This power slide window 1 is fitted on a rear end of a cabin of a pickup truck as a rear window, and includes a window glass pane 2. The window glass pane 2 extends substantially vertically with the major plane thereof facing in a fore and aft direction, and is provided with a laterally elongated substantially rectangular shape such that the lateral dimension along the major plane is greater than the vertical dimension along the panel surface. The window glass pane 2 is slightly curved along the right and left edges and the upper and lower edges thereof so as to be convex toward the rear.

A rectangular opening 2a (FIG. 2) is formed in a central part of the window glass pane 2, and a rectangular slide panel 3 is provided on the window glass pane 2 so as to close the opening 2a The outer periphery and the inner periphery around the opening 2a of the window glass pane 2 are formed with light shielding portions 2c on the front surface thereof (which will be referred to as panel surface 2b) by applying a light shielding treatment or by applying a paint containing black pigment (black ceramic coating).

An upper and lower guide rail 4 extending laterally and horizontally in parallel to each other along the panel surface 2b are attached to the corresponding light shielding portions 2c of the window glass pane 2. In particular, the slide panel 3 is configured to be slidable in the lateral direction along the upper and lower guide rails 4.

Figure 2:
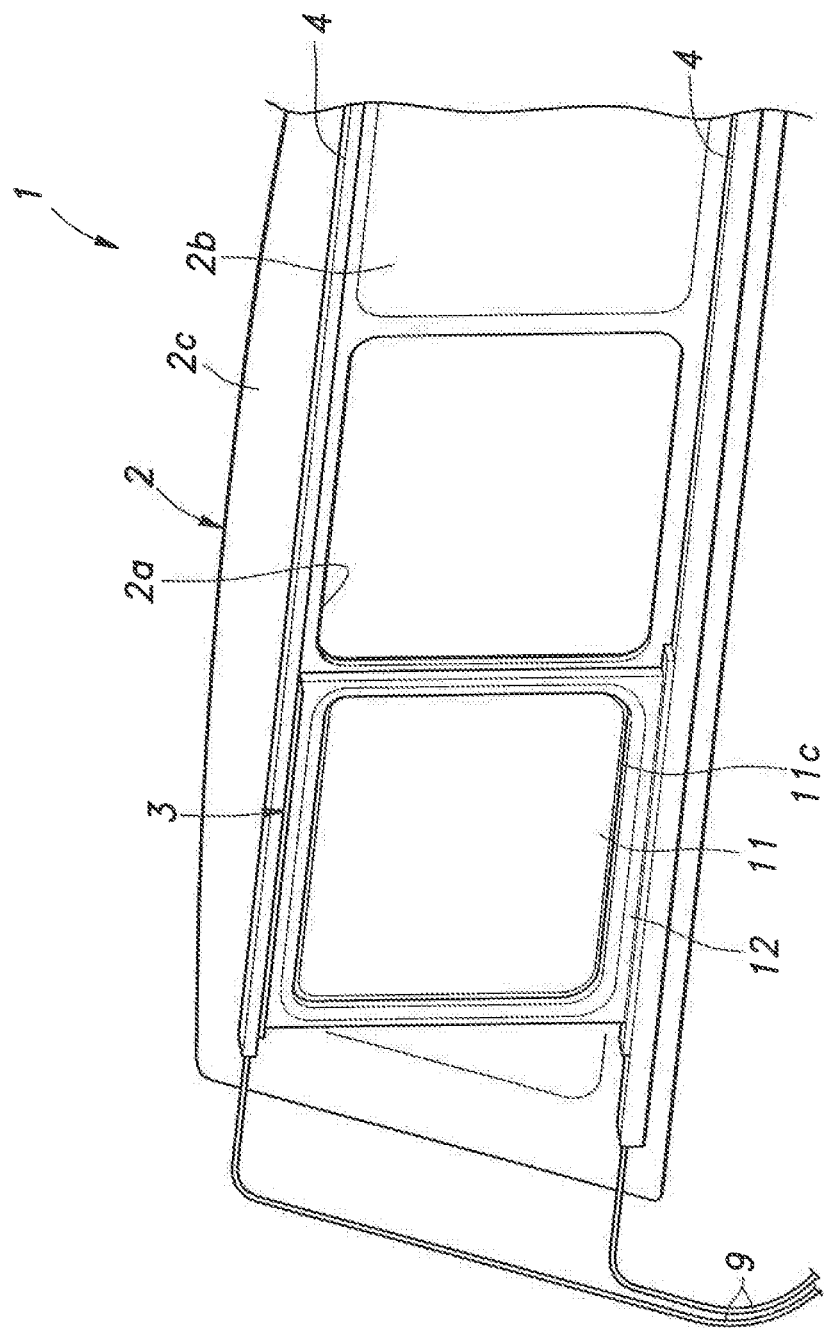
FIG. 2 is a fragmentary perspective view of the power slide window shown in FIG. 1 in a closed state.

In the present embodiment, the slide panel 3 is configured to selectively open and close the opening 2a by sliding between a closed position in which the opening 2a is closed as shown in FIG. 1, and an open position in which the opening 2a is opened by sliding from the closed position to the left as shown in FIG. 2. The slide panel 3 in the closed position is positioned in a more forward position (inboard side of the window glass pane 2) than in the open position.

In an alternate embodiment, the slide panel 3 opens only a part of the opening 2a in the open position. In another alternate embodiment, the slide panel 3 is configured to slide to the right from the closed position to open the opening 2a. It is also possible to arrange such that the slide panel 3 is slidable in either lateral direction from the closed position thereof so that the opening 2a may be opened by sliding the slide panel 3 in either lateral direction from the closed position. Also, the slide panel 3 in the closed position may be positioned in a more rearward position (outboard side of the window glass pane 2) than in the open position.

As shown in FIG. 1, a drive source 5 for slidingly driving the slide panel 3 is provided in a part of the vehicle body located under the window glass pane 2. The drive source 5 includes an electric motor 6, a speed reduction mechanism, and a housing 8 that houses the speed reduction mechanism, and is fixedly attached to the vehicle body via the housing 8. Four guide pipes 9 are connected to the housing 8. The two guide pipes 9 located on the right side extend rightward from the housing 8, and are then curved upward before being connected to the upper and lower guide rails 4, respectively, from the right side. The two guide pipes 9 located on the left side extend leftward from the housing 8, and are then curved upward before being connected to the upper and lower guide rails 4, respectively, from the left side.

The two guide pipes 9 connected to the upper guide rail 4 are connected to a relatively front part of the housing 8, and the two guide pipes 9 connected to the lower guide rail 4 are connected to a relatively rear part of the housing 8. The guide pipes 9 slidably receive therein cables 10 (see FIG. 3) for slidingly driving the slide panel 3 by transmitting the drive force of the drive source 5.

The upper cable 10 on the right side and the upper cable 10 on the left side are complementarily wound and unwound (or paid out) by a common pulley having a rotational center line extending in the fore and aft direction. Similarly, the lower cable 10 on the right side and the lower cable 10 on the left side are complementarily wound and unwound (or paid out) by another common pulley. These two pulleys are integrally combined to each other such that the right and left upper cables 10 and the right and left lower cables 10 are wound and unwound by the two pulleys of the drive source 5 in synchronism. These cables serve as a power transmission means for transmitting the drive force of the drive source 5 to the slide panel 3 (via sliders 20 to be more precise as will be described hereinafter).

Figure 3:
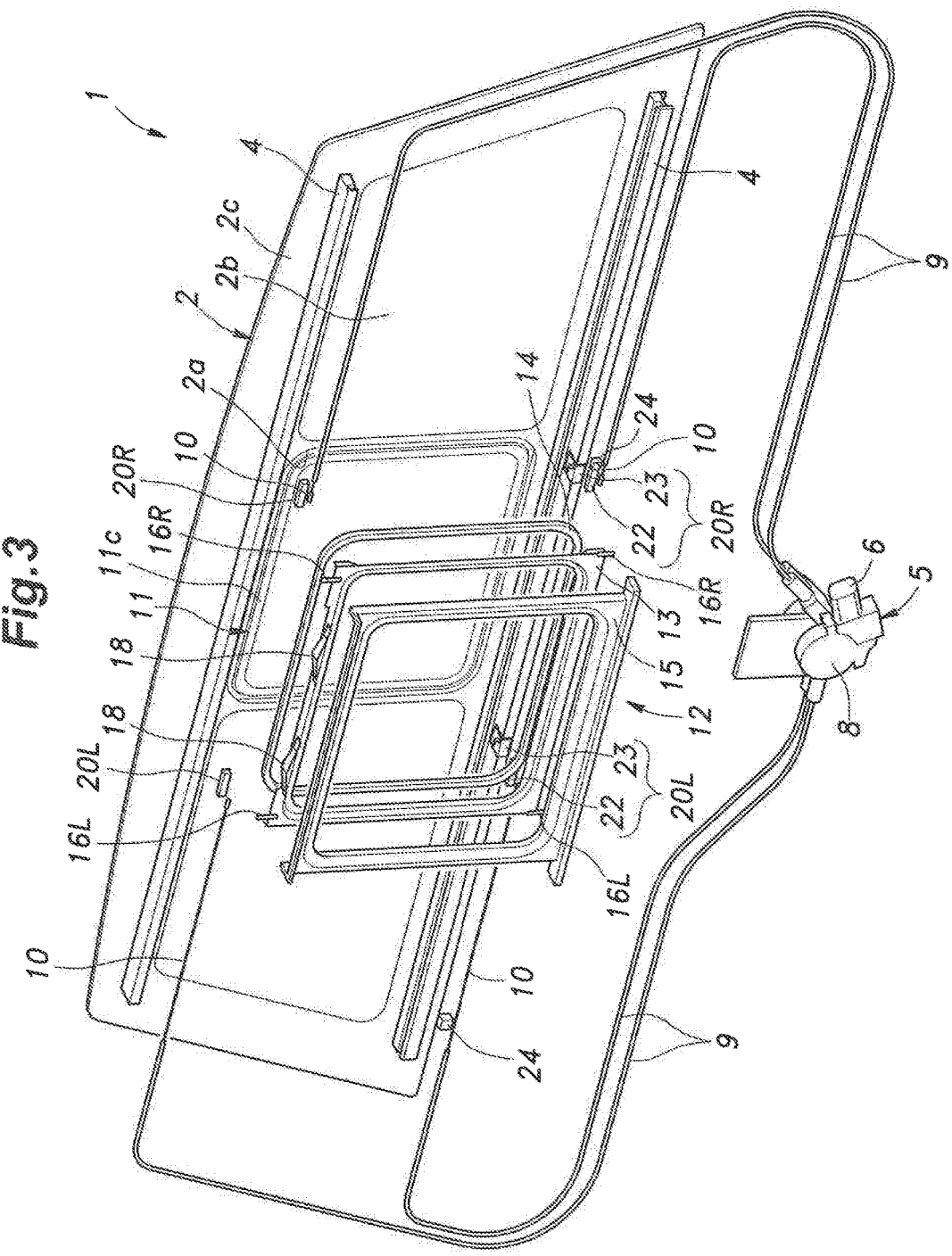
FIG. 3 is an exploded perspective view of the power slide window shown in FIG. 1.
Figure 4:
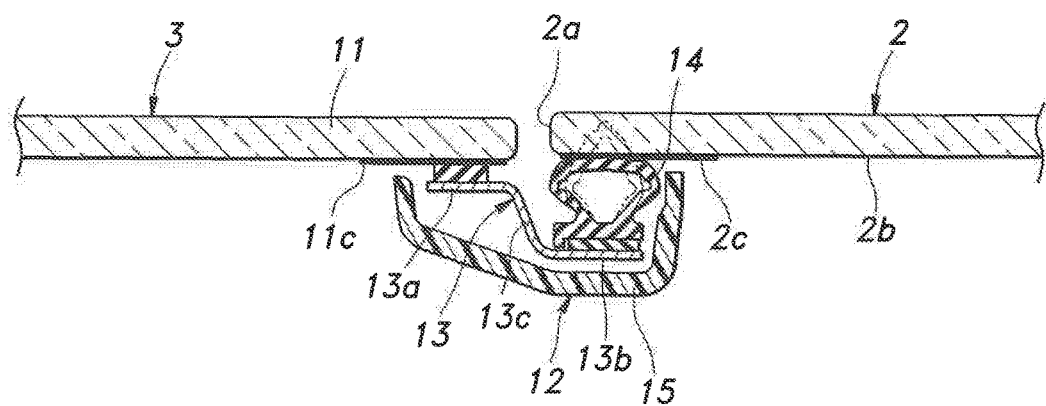
FIG. 4 is a sectional view taken along line IV-IV of FIG. 1.

FIG. 3 is an exploded perspective view of the power slide window 1 shown in FIG. 1. FIG. 4 is a sectional view taken along line IV-IV of FIG. 1. As shown in FIGS. 3 and 4, the slide panel 3 includes a movable glass pane 11 having the same thickness as the window glass pane 2, and a frame 12 provided on the periphery of the movable glass pane 11. The movable glass pane 11 is formed somewhat smaller than the opening 2a of the window glass pane 2, and is arranged parallel to the window glass pane 2 in the opening 2a so as to be flush with the window glass pane 2. The periphery of the movable glass pane 11 is formed with a light shielding portion 11c by applying a light shielding treatment or by applying of a paint containing black pigment (black ceramic coating).

The frame 12 includes a bracket frame 13 joined to the inner surface of the light shielding portion 11c of the movable glass pane 11 via an adhesive. The bracket frame 13 is provided with a rectangular annular shape having an inner contour smaller than the outer contour of the movable glass pane 11 and an outer contour larger than the outer contour of the movable glass pane 11. As shown in FIG. 4, the bracket frame 13 includes an inner portion 13a opposing the movable glass pane 11 at a position relatively close to the inner surface of the movable glass pane 11, and an outer portion 13b opposing the window glass pane 2 (which is flush with the inner surface of the movable glass pane 11) at a position relatively remote from the inner surface of the window glass pane 2, and an intermediate portion 13c connecting the inner portion 13a and the outer portion 13b with each other. Thus, the bracket frame 13 is provided with a crank-shaped cross section.

An annular seal member 14 having a hollow cross-sectional shape is attached to the rear surface of the outer portion 131 of the bracket frame 13 by using an adhesive agent. The seal member 14 is made of an elastic material having a low elastic modulus such as synthetic rubber. When no external force is applied, the seal member 14 has a height greater than the distance from the bracket frame 13 to the inner surface of the window glass pane 2 as shown by the imaginary line in FIG. 4. When the movable glass pane 11 is flush with the window glass pane 2, the seal member 14 is elastically deformed so as to reduce its height as indicated by the solid line in FIG. 3, and the distal end thereof resiliently abuts the inner surface of the window glass pane 2. Thereby, the sealing between the movable glass pane 11 and the window glass pane 2 is ensured.

A front side of the bracket frame 13 is fitted with an annular cover frame 15 that covers the seal member 14 and the bracket frame 13. The cover frame 15 is fixed to the bracket frame 13 at appropriate positions thereof. Thus, the frame 12 including the bracket frame 13, the seal member 14 and the cover frame 15 is provided on the front side (cabin side) of the movable glass pane 11, and extends over the light shielding portion 11c of the movable glass pane 11 and, the light shielding portion 2c of the window glass pane 2. As a result, the gap between the peripheral edge of the movable glass pane 11 and the opening edge of the window glass pane 2 is covered by the frame 12 from the cabin side over the entire periphery.

As shown in FIG. 3, a right upper pin 16R and a left upper pin 16L integrally project upward from the left and right end portions of the upper part of the bracket frame 13, respectively. A right lower pin 17R and a left lower pin 17L integrally project downward from the left and right end portions of the lower part of the bracket frame 13, respectively. The right upper pin 16R is longer than the left lower upper pin 16L, and the right lower pin 16R is longer than the left lower pin 16L. Further, a pair upper leaf springs 18 are provided on the upper surface of the upper part of the bracket frame 13. The leaf springs 18 resiliently contact the lower surface of the upper guide rail 4 to urge the bracket frame 13 downward, and slide along the lower surface of the upper guide rail 4 as the bracket frame 13 slides.

A left upper slider 20L and a right upper slider 20R are slidably provided on the upper guide rail 4, and a left lower slider 21L and a right lower slider 21R are slidably provided on the lower guide rail 4. The left and right upper sliders 20 (20L, 20R) and the left and right lower sliders 21 (21L, 21R) are each provided with a shaft member 22 extending along the corresponding guide rail 4, a plate member 23 integrally connected to the shaft member 22 and extending horizontally (only the lower two of them are shown in the drawings).

Figure 5:
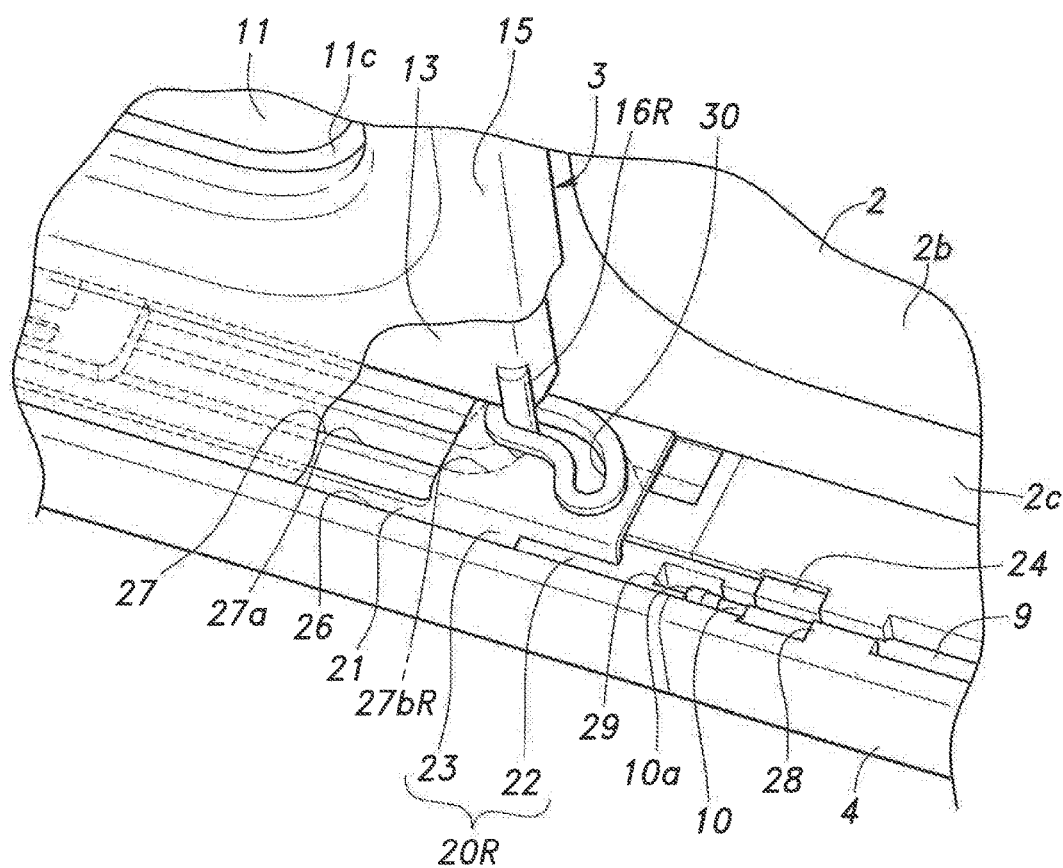
FIG. 5 is a fragmentary perspective view of a part indicated by V in FIG. 1.

In the illustrated embodiment, the plate members 23 of the upper sliders 20 are connected to each other by a connecting portion 21, and the plate members 23 of the lower sliders 20 are similarly connected to each other by a connecting portion 21 (only the lower connecting portion 21 is shown in FIG. 5). In other words, the right and left upper sliders 20L and 20R essentially consist of a single upper slider 20, and the right and left lower sliders 20L and 20R essentially consist of a single lower slider 20.

Each shaft member 22 is connected to an end of the corresponding one of the four cables 10 for slidingly driving the slide panel 3 so that the drive force of the drive source 5 is transmitted to the upper sliders 20 and the lower sliders 20. Each plate member 23 engages the corresponding one of the upper pins 16 and the lower pins 17. Thus, the slide panel 3 is supported by the right and left upper sliders 20 and the right and left lower sliders 20 via the right and left upper pins 16 and the right and left lower pins 16, respectively. In other words, the four cables 10 are connected to the left and right end portions of the upper and lower portions of the slide panel 3 via the left and right upper sliders 20 and the left and right lower sliders 21, respectively, so that the drive force of the drive source 5 is transmitted to the slide panel 3 via the right and left upper sliders 20 and the right and left lower sliders 20.

In an alternate embodiment, push-pull cables are used for the power transmission means, and the right and left upper sliders 20L and 20R are separated from each other while the right and left lower sliders 20L and 20R are also separated from each other. In another alternate embodiment, push-pull cables are used for the power transmission means, and the right and left upper sliders 20L and 20R are integrally joined to each other while the right and left lower sliders 20L and 20R are also integrally joined to each other. In this case, the push-pull cables extend only in one direction from the integral upper sliders 20 and the integral lower sliders 20. It is also possible to have the push-pull cables to extend from the upper sliders in one direction or in both directions and from the lower sliders in one direction or in both directions.

The left ends of the upper and lower guide rails 4 are each provided with a left stopper 24 (only the lower side left stopper is shown in the drawings) made of elastic material to limit the leftward movement of the slide panel 3 at the open position thereof by engaging the left upper slider 20L or the left lower slider 20L, as the case may be. The right ends of the upper and lower guide rails 4 are each provided with a right stopper 24R (only the lower side right stopper is shown in the drawings) made of elastic material to limit the rightward movement of the slide panel 3 at the open position thereof by engaging the right upper slider 20R or the right lower slider 20R, as the case may be.

The connecting structure between the cable 10 and the slide panel 3 via the left lower slider 20L differs from the connecting structure between the cable 10 and the slide panel 3 via the right lower slider 20R only in the direction in which the cable extends from the lower slider 20, but the two structure are otherwise similar to each other. The connecting structure between the cable 10 and the slide panel 3 via each upper slider 20 differs from the connecting structure between the cable 10 and the slide panel 3 via each lower slider 20 only in that the two structures are a mirror image of each other, but the two structure are otherwise similar to each other. Therefore, the connecting structures via the respective sliders 20 are described in the following only in regard to the connecting structure via the right lower slider 20R. The term "lower" is omitted in the following description.

FIG. 5 is an enlarged view of a part indicated by V in FIG. 1. As shown in FIG. 5, the upper surface of the guide rail 4 is provided with a slider guide groove 26 for slidably receiving the slider 20 and a pin guide groove 27 for receiving and guiding the pin 16.

The slider guide groove 26 extends laterally along the guide rail 4. The right stopper 24 is provided in the slider guide groove 26, and is supported by a support wall 28 which is formed so as to project into the slider guide groove 26. The part of the slider guide groove 26 to the right of the support wall 28 receives the guide pipe 9. The free end of the guide pipe 9 abuts the support wall 28, and the right lower cable 10 extending from the free end of the guide pipe 9 extends to the right slider 20R via a groove formed in the right stopper 24. The free end of the cable 10 is provided with an engaging end portion 10a having an increased diameter.

FIG. 6 shows (A) a sectional plan view and (B) a sectional vertical view (taken along line B-B in (A) of FIG. 6) of the power slide window in the closed state. As shown in (B) of FIG. 6 also, the pin guide groove 27 includes a groove main portion 27a extending laterally along the length of the guide rail 4, and a right groove extension portion 27bR extending from the right end of the right groove extension portion 27bR in an oblique direction directed to the right and the rear in a continuous manner. The right groove extension portion 27bR is curved toward the rear as the right groove extension portion 27bR extends rightward. A left groove extension portion 27bL extend from a laterally intermediate part of the groove main portion 27a in an oblique direction directed to the right and the rear in a continuous manner. The left groove extension portion 27bL is also curved toward the rear as the left groove extension portion 27bL extends rightward. The right groove extension portion 27bR and the left groove extension portion 27bL extend at an angle to the lengthwise direction of the guide rail 4, and are substantially identical in shape in plan view. However, since the left groove extension portion 27bL extends rearward from the intermediate part of the groove main portion 27a, the left groove extension portion 27bL may be shorter than the right groove extension portion 27bR by the amount the left groove extension portion 27bL overlaps with the groove main portion 27a.

As shown in (B) of FIG. 6, the groove main portion 27a is provided with a constant depth. The left groove extension portion 27bL is shallower than the groove main portion 27a, and the right groove extension portion 27bR has a same depth as the groove main portion 27a. Therefore, the left groove extension portion 27bL is shallower than the right groove extension portion 27bR The depth D of the pin guide groove 27 and the projecting length L of the pin 16 into the pin guide groove 27 are determined such that the left lower pin 161, has a smaller projecting length LL than a depth DL of the left groove extension portion 27bL, and the right lower pin 16R has a projecting length LR greater than the depth DL of the left groove extension portion 27bL, and smaller than a depth DR of the right groove extension portion 27bR (LL<DL<LR<DR). As a result, the left lower pin 16L can advance into the left groove extension portion 27bL, while the right lower pin 16R cannot advance into the left groove extension portion 27bL but can advance into the right groove extension portion 27bR. The same relationship holds with regard to the projecting length L of each upper pin 16, and the depth D of the corresponding pin guide groove 27.

As shown in FIG. 5, the shaft member 22 of the right slider 20R is formed with a cable holding groove 29 which opens to the upper surface thereof and reaches the right end thereof. The cable holding groove 29 is provided with a greater cross section in the left side part thereof than in the right side part thereof. The cross section of the right side part of the cable holding groove 29 is dimensioned such that the main body portion of the cable 10 can pass through the cable holding groove 29, but the engaging end portion 10a cannot pass through the cable holding groove 29. The right lower cable 10 is inserted into the cable holding groove 29 from above, and extends rightward from the right end of the right lower slider 21R while the engaging end portion 10a is received in the left side portion of the cable holding groove 29 and is engaged therein. Similarly, as shown in FIG. 3, the left lower cable 10 extends leftward from the left end of the left lower slider 20L, the left upper cable 10 extends leftward from the left end of the left upper slider 20L, and the right upper cable 10 extends rightward from the right end of the right upper slider 20R.

As shown in (A) of FIG. 6 also, the plate member 23 of the right slider 21R is provided with a pin drive groove 30 through which the right pin 17 projects into the pin guide groove 27. The pin drive groove 30 extends in the fore and aft direction in the front part of the plate member 23, and is inclined leftward along a curved path as one moves rearward (or is curved in such a manner that the inclination angle thereof with respect to the fore and aft direction increases as one moves rearward). The pin drive groove 30 then extends substantially laterally in the rear end part of the plate member 23. In other words, the pin drive groove 30 is inclined so as to move away from the window glass pane 2 as one moves from the left to the right, and is also at an angle both to the fore and aft direction which is orthogonal to the panel surface 2b of the window glass pane 2 and to the lateral direction or the longitudinal direction of the guide rail 4. In the state shown in FIG. 5 and (A) of FIG. 6 or when the slide panel 3 is in the closed position, the right pin 17 is positioned at the left end of the pin drive groove 30 and at the right end (the rear end of the groove extension portion 27b) of the pin guide groove 27. The left slider 20L is also provided with a pin drive groove 30 which is identically shaped as that in the right slider 20R.

As described above, the lower cable 10 on the right side and the lower cable 10 on the left side which are wound on and unwound from the same pulley in a complemental manner constitute a lower drive cable that slidingly drives the lower portion of the slide panel 3. Similarly, the upper cable 10 on the right side and the upper cable 10 on the left side which are wound on and unwound from the same pulley in a complemental manner constitute an upper drive cable that slidingly drives the upper portion of the slide panel 3.

FIG. 7 is an explanatory diagram of the opening and closing operation of the power slide window 1, in which (A) shows the state where the slide panel 3 is in the closed position, (B) shows the state where the slide panel 3 has been slid forward from the closed position, and (C) shows the state where the slide panel 3 in the most forward and leftward position. FIG. 7(A) is identical to FIG. 6(A). When the slide panel 3 is to be opened, the state of the power slide window 1 progresses from (A) to (C). Conversely, when the slide panel 3 is to be closed, the state of the power slide window 1 progresses from (C) to (A).

As shown in FIG. 7(A), when the slide panel 3 is in the closed position and flush with the window glass pane 2, the pins 16 (16L and 16R) are each positioned at the rear end (left end) of the corresponding pin drive groove 30 of the plate member 23, and is located at the rear end of the corresponding groove extension portion 27b of the pin guide groove 27. Under this condition, when the lower drive cable 10 is complementarily wound and unwound in the leftward direction, and the sliders 20 (20L, 20R) are slidingly driven to the left, the left and right pins 16 are driven forward along the respective groove extension portions 27b of the pin guide groove 27, and are at the same time moved forward and leftward along the groove extension portion 27b of the pin guide groove 27 as shown in FIG. 7(B). As a result, the entire slide panel 3 undergoes a sliding movement such that the window glass pane 2 moves initially forward and then leftward while maintaining an attitude in parallel with the panel surface 2b. In the state shown in FIG. 7(B), the rear surface of the movable glass pane 11 is positioned ahead of the panel surface 2b of the window glass pane 2.

Thereafter, when the cable 10 is complementarily wound and unwound further in the leftward direction, and the sliders 20 are slid to the left, as shown in FIG. 7(C), the left and right pins 16 move to the left along the pin guide groove 27 while being positioned at the front ends of the corresponding pin drive groove 30, respectively. As a result, the entire slide panel 3 slides to the left in this way, by forming the pin drive groove 30 elongated in the fore and aft direction in the plate member 23, the slide panel 3 can be moved in the fore and aft direction without causing a change in the fore and aft positions of the shaft member 22 and the cable 10.

The open position of the slide panel 3 is defined as the position at which the opening 2a of the window glass pane 2 is entirely opened up as shown in FIG. 2. When the slide panel 3 is in the open position, the right pin 16R is positioned in a part of the groove main portion 27a located to the left of the left groove extension portion 27bL.

When the slide panel 3 is in the open position, by causing the cable 10 to be complementarily wound and unwound so as to move the cable 10 rightward, the sliders 20 are slidingly driven to the right with the result that the state shown in FIG. 7 (A) is restored via the state shown in (B) and (C) of FIG. 7. When the slide panel 3 moves from the open position to the closed position shown in FIG. 7(C), the right pin 16L passes through the branching point or the junction (adjacent to the left groove extension portion 27bL) between the rightwardly extending groove main portion 27a and the rearwardly curving left groove extension portion 27bL. At this time, since the projecting length LL of the right pin 16L is greater than the depth DL of the left groove extension portion 27b, the right pin 16L is prevented from advancing into the left groove extension portion 27bL.

When the slide panel 3 moves from the position shown in FIG. 7(B) to the position shown in FIG. 7(A), the left pin 16L passes through the part (junction) adjacent to the left groove extension portion 27bL, and advances to the groove extension portion 27h without advancing into the groove main portion 27a. The reason for this is explained in the following. The groove main portion 27a is inclined so as to guide the left pin 16L in a rearward direction as the left pin 16L moves rightward owing to the rightward movement of the slider 20. The pin drive groove 30 of the plate member 23 extends in the fore and aft direction to allow the fore and aft movement of the left pin 16L, and is inclined so as to apply a force containing a rearward component to the left pin 16L when the slider 20 moves to the right (in a direction to slide the left pin 16L rearward). Therefore, when the slider 20 moves to the right, not only the right pin 16R is driven rearward by the right groove extension portion 27b but also, at the same time, the left and right plate members 23 are moved to the right by the left and right pins 16R and 16L, respectively. As a result, as the lower slider 21 moves rightward, the right pin 16R is guided in the rearward direction by the right groove extension portion 27b, and the right and left plate members 23 are moved rightward relative to the right and left pins 16L, 16R. Thus, the left pin 16L is guided rearward by the left pin drive groove 30, and then to the groove extension portion 27b so that the transition from the lateral sliding movement to the fore and aft movement by the slide panel 3 can be accomplished in a smooth manner.

Thus, in the power slide window 1 of the illustrated embodiment, as shown in FIG. 5, the guide rail 4 is provided with a pin guide groove 27 including a groove main portion 27a and a groove extension portion 27b, and the slider 20 is provide with a pin drive groove 30 extending in a direction crossing the panel surface 2b. The slide panel 3 is provided with at least one pin 16 projecting into the pin drive groove 30 and the pin guide groove 27. The slide panel 3 is positioned in the closed position when the at least one pin is positioned in the groove extension portion 27b, and in the open position when the pin is positioned in the groove main portion 27a.

Owing to this structure, as the drive source 5 slidingly drives the slider 20 in the lengthwise direction of the guide rail 4, the drive force is transmitted to the pin 16 projecting into the pin drive groove 30 so that the pin moves along the pin guide groove 27. Since the pin drive groove 30 extends at an angle to the lengthwise direction of the guide rail 4, the movement of the pin 16 toward and away from the panel surface, 2b of the window glass pane 2 is permitted so that the slide panel 3 can be slidingly driven in a direction crossing the panel surface 2b of the window glass pane 2 as the pin 16 moves along the groove main portion 27a as shown in FIGS. 7(A) and 7(B). As the pin 16 moves along the groove main portion 27a as shown in FIGS. 7(B) and 7(C), the slide panel 3 is slidingly driven in a direction extending along the panel surface 2b of the window glass pane 2. Owing to these actions, the slide panel 3 is enabled to smoothly slide between the closed position and the open position to close and open the opening 2a.

In the illustrated embodiment, as shown in FIGS. 3 and 7, the slide panel 3 is provided with the right pin 16R on the right side which is on the side of the closed position, and the left pin 16L on the left side which is on the side of the open position. The right end of the groove main portion 27a continues with the right groove extension portion 27bR where the right pin 16R is located when the slide panel 3 is in the closed position, and the lengthwise intermediate part of the groove main portion 27a continues with the left groove extension portion 27bL where the left pin 16L is located when the slide panel 3 is in the closed position. Therefore, as the right pin 16R and the left pin 16L move in the right groove extension portion 27bR and the left groove extension portion 27bL, respectively, the drive force directed to cause the slide panel 3 to move toward and away from the panel surface 2b of the window glass pane 2 acts upon the right hand side and the left hand side of the slide panel 3. As a result, the sliding movement of the slide panel 3 between the closed position and the open position can be effected in a smooth manner.

The left groove extension portion 27bL is shallower than the right groove extension portion 27bR, and the left pin 16L has a smaller projecting length LL, than the depth DL of the left groove extension portion 27bL. Further, the right pin 16R has a projecting length LR which is smaller than the depth DR of the right groove extension portion 27bR, but greater than the depth DL of the left groove extension portion 27bL. Therefore, when the right pin 16R has moved to the left part of the pin guide groove 27 after passing by the left groove extension portion 27bL, the slide panel 3 can return to the right part of the pin guide groove 27 without advancing into the left groove extension portion 27bL. Also, when the right pin 16R passes by the left groove extension portion 27bL, no rattling occurs.

As shown in FIGS. 5 and 6, the pin drive groove 30 slants away from the window glass pane 2 as one moves from the left side which is on the side of the open position to the right side which is on the side of the closed position. Owing to this arrangement, as the slider slides from the side of the open position to the side of the closed position, a component of the drive force that is directed to cause the pin 16 to move toward the window glass pane 2 acts upon the pin 16. As a result, as the pin moves along the groove extension portion 27b, owing to the slider 20 moving in the same direction as the pin 16, the slide panel 3 is enabled to be smoothly slid in the direction orthogonal to the panel surface 2b of the window glass pane 2 in a reliable manner.

The pin drive groove 30 is curved so that the slant angle of the pin drive groove 30 with respect to the direction orthogonal to the panel surface 2b of the window glass pane 2 become greater as one moves toward the window glass pane 2. Owing to this arrangement, as the pin 16 moves toward the window glass pane 2 along the groove extension portion 27b, the component of the drive force that causes the pin 16 to move toward the window glass pane 2 or to cause the pin 16 to move away from the window glass pane 2, as the case may be, to become greater. Therefore, even when the sliding drive force applied to the slider 20 is small, the slide panel 3 can be slid toward the closed position or away from the closed position in a both reliable and smooth manner.

Meanwhile, the groove extension portion 27b extends along a curved path as the groove extension portion 27b extends toward the window glass pane 2. Owing to this arrangement, the transition of the sliding movement of the slide panel 3 between the movement along the lengthwise direction of the guide rail 4 and the movement in the direction orthogonal to the panel surface 2b of the window glass pane 2 can be effected in a smooth manner, and thus, the sliding movement of the slide panel 3 can be made in a smooth manner.

Although the present invention has been described in terms of a concrete embodiment, the present invention is not limited to the above-described embodiment, but can be modified in various ways. For example, the power slide window 1 was applied to the rear window of a pickup truck as an example in the above embodiment, but may also be applied to a rear window or a side window of a minivan or the like. Also, the various structures, positions, numbers and angles of the various members and portions may be freely modified without departing from the spirit of the present invention. The various components of the illustrated embodiment are not necessarily essential for the present

GLOSSARY OF TERMS

| 1 | power slide window | 2 | window glass pane |
|---|---|---|---|
| 2a | opening | 2b | panel surface |
| 3 | slide panel | 4 | guide rail |
| 5 | drive source | 10 | cable |
| 16 | pin | 16L | left pin (second pin) |
| 16R | right pin (first pin) | 20 | slider |
| 27 | pin guide groove | 27a | groove main portion |
| 27b | groove extension portion | | |
| 27bL | left groove extension portion (second groove extension portion) | | |
| 27bR | right groove extension portion (first groove extension portion) | | |
| 30 | pin drive groove | | |
| DR | depth of right groove extension portion 27bR | | |
| DL | depth of left groove extension portion 27bL | | |
| LL | projection length of left pin 16L into pin guide groove | | |
| LR | projection length of right pin 16R into pin guide groove | | |

The invention claimed is:

1. A power slide window, comprising:
a window glass pane having an opening formed therein;
a guide rail provided on the window glass pane along a panel surface thereof;
a slider provided on the guide rail so as to be slidable along a lengthwise direction of the guide rail;
a drive source for slidingly driving the slider;
a pin guide groove formed in the guide rail and including a groove main portion extending along the lengthwise direction of the guide rail and at least one groove extension portion extending from the groove main portion in a direction to approach the window glass pane;
at least one pin drive groove formed in the slider so as to extend in a direction crossing the panel surface; and
a slide panel provided with at least one pin projecting into the at least one pin drive groove and the pin guide groove so that the slide panel is positioned in a closed position closing the opening when the at least one pin is positioned in the at least one groove extension portion, and in an open position opening the opening when the at least one pin is positioned in the groove main portion,
wherein the at least one pin includes a first pin provided in a part of the slide panel on a side of the closed position, and a second pin provided in a part of the slide panel on a side of the open position,
wherein the at least one groove extension portion includes a first groove extension portion continuing from an end of the groove main portion on a side of the closed position to have the first pin positioned therein when the slide panel is in the closed position, and a second groove extension portion continuing from an intermediate part of the groove main portion with respect to the lengthwise direction to have the second pin positioned therein when the slide panel is in the closed position, and
wherein the second groove extension portion is shallower than the first groove extension portion, the second pin having a smaller projecting length than a depth of the second groove extension position, the first pin having a projecting length smaller than a depth of the first groove extension portion and greater than the depth of the second groove extension portion.

2. The power slide window according to claim 1, wherein the at least one pin drive groove is slanted with respect to the panel surface in a direction to move away from the window glass pane as the at least one pin drive groove extends from a side of the open position w a side of the closed position.

3. The power slide window according to claim 2, wherein the at least one pin drive groove is curved so as to increase a slanting angle thereof relative to a direction orthogonal to the panel surface as the at least one pin drive groove extends toward the window glass pane.

4. The power slide window according to claim 1, wherein the at least one groove extension portion is curved toward the window glass pane as the at least one groove extension portion extends from the groove main portion.

* * * * *